XR 3,314,022
CROSS REFERENCE

April 11, 1967 A. H. MEITZLER 3,314,022

PARTICULAR MODE ELASTIC WAVE AMPLIFIER AND OSCILLATOR

Filed June 29, 1964 2 Sheets-Sheet 1

INVENTOR
A. H. MEITZLER
BY [signature]
ATTORNEY

3314022
OR IN 331/107R

United States Patent Office 3,314,022

Patented Apr. 11, 1967

3,314,022

PARTICULAR MODE ELASTIC WAVE AMPLIFIER AND OSCILLATOR

Allen H. Meitzler, Morristown, N.J., assignor to Bell Telephone Laboratories, Incorporated, New York, N.Y., a corporation of New York Filed June 29, 1964, Ser. No. 378,648
4 Claims. (Cl. 331—107)

This invention relates to solid state acoustical or ultrasonic amplifiers of the type disclosed in the copending application of D. L. White, Ser. No. 105,700, filed April 26, 1961, now Patent 3,173,100, granted March 9, 1965, and more particularly to amplification of selected ones of the modes of elastic wave propagation possible in a medium having at least one cross-sectional dimension that is comparable to or less than the wavelength of the elastic vibration.

As disclosed in the above-identified copending application of D. L. White, an acoustic wave propagating through a high resistivity piezoelectric semiconductor can be influenced through its interaction with free charge carriers in the semiconductor which are bunched by the piezoelectric field and caused to drift under the influence of an external D.-C. bias. These charge carriers are the electrons in n-type semiconductor material or holes in p-type semiconductor material. More particularly, if the conditions are such that the average drift velocity of the charge carriers is greater than the velocity of the acoustic wave, the acoustic wave grows in amplitude as it propagates. If the charge velocity is less than the acoustic wave velocity, the acoustic wave is diminished.

The wave motion considered by White and in subsequent disclosures related thereto, takes place in an elastic wave medium of dimensions which are large in all directions compared to the wavelength of the elastic wave so that the wave propagates essentially as a plane wave in an infinite medium, free from surface interactions. Multiple modes of propagation do not tend to be excited and no distinction need be made between phase and group velocity parameters of the wave which are in fact identical to each other.

The art is also familiar with wave motion in a medium having at least one cross-sectional dimension which is comparable to the elastic wavelength as a result of which the elastic wave interacts strongly with the bounding surfaces. Many different modes of propagation are possible and the boundary interaction modifies in unique ways the phase velocity, group velocity and attentuation characteristics of the separate modes as functions of frequency. To distinguish them from the simpler forms of propogation, these latter modes are commonly designated "guided" wave modes.

It is therefore a broad object of the invention to extend the principles of ultrasonic amplification to guided wave modes of ultrasonic propagation.

In accordance with the present invention, it has been recognized that new and particularly useful results are obtained by promoting free charge carrier interaction with certain selected ones of the possible guided modes of propagation in thin strips of elastic material in order to take advantage of one unique characteristic or a combination of these characteristics typical of one mode as opposed to others.

It is thus a more specific object of the invention to modify the propagation of guided wave modes by means of drifting free charge carriers in a piezoelectric semiconductive propagation medium to obtain new and useful characteristics not heretofore available.

More particularly, according to a first illusrtative application of the principles of the invention, free charge carrier interaction is promoted with the first longitudinal mode of propagation in a thin rectangular strip of propagation material. This mode has an otherwise useful dispersion characteristic except for an accompanying undesirable attentuation versus frequency characteristic. As a result of the interaction, a modified mode is produced in which the useful dispersion characteristic is preserved and in which the attenuation characteristic is made substantially independent of the frequency.

According to another illustrative application of the principles of the invention, charge carrier interaction is promoted with the second longitudinal mode of propagation. This mode has useful dispersive as well as nondispersive characteristics except for the fact that its excitation to the exclusion of the other possible modes has been difficult to achieve heretofore. In the presence of carrier interaction with the second mode, however, propagation of the second mode is favored to the exclusion of the other modes and only it propagates for any extended distance along the interaction path.

In a final illustrative application of the principles of the invention, charge carrier interaction is promoted with the third longitudinal mode in the limited region in which this mode has a phase velocity of opposite sign to all other modes for frequencies within a given band. Stable amplification over a bandpass frequency range is thus obtained.

A modification of the structure utilizing any one of these propagation modes provides an oscillator having a frequency dependent upon the readily variable drift velocity of the charge carriers.

These and other objects and features, the nature of the present invention and its various advantages, will appear more fully upon consideration of the specific illustrative embodiment shown in the accompanying drawings and described in detail in the following explanation of these drawings.

Figure 1:
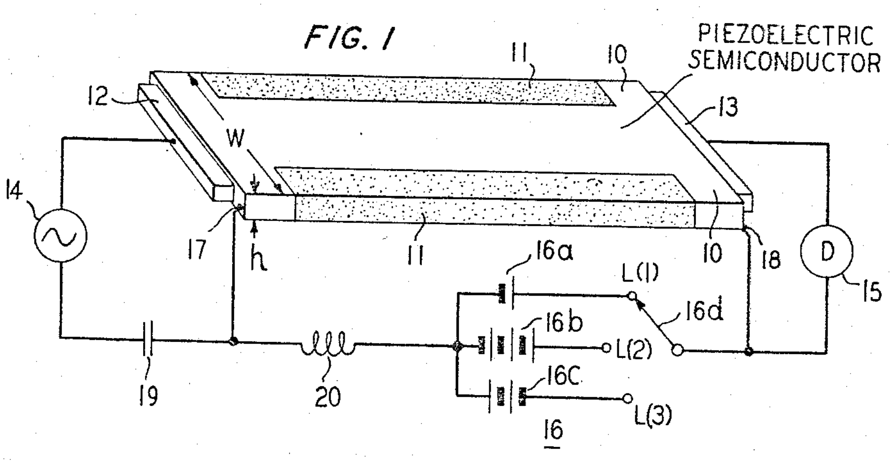
FIG. 1 is a schematic perspective view of an acoustic wave device constructed in accordance with the teachings of the invention.

Referring more particularly to FIG. 1 there is shown a schematic perspective view of a guided wave device utilizing the foregoing principles of the invention. Body 10 comprises a single member, preferably a single crystal, of high resistivity, piezoelectric, semiconductive material of one of the compositions described as suitable in the above-mentioned White application. Specifically, these materials include ones from Groups III–V such as gallium arsenide or from Groups II–VI such as cadmium sulphide or cadmium selenide. Body 10 is in the form of a strip having parallel major surfaces spaced apart by a small thickness dimension equal to $h$ and parallel minor surfaces spaced by a width dimension $w$ that is large, in the order of ten times that of $h$. The longitudinal axis of body 10 as well as its thickness dimension extend in directions of pure longitudinal wave motion which consist of one of the crystallographic axes of the material from which body 10 is formed as disclosed in detail in my copending application Ser. No. 190,690, filed April 27, 1962, now Patent 3,259,858, granted July 5, 1966. Further, the orientation of the strip in the length direction would have to correspond to the same orientation, relative to the crystal axes, as used in the above-mentioned White application for the drifting charges to couple energy by means of the piezoelectric constants of the medium to the acoustic wave motion in the material. To minimize interaction of the guided elastic wave motion with the minor surfaces of body 10, these minor surfaces along with the adjacent portions of the major surfaces are coated or covered with absorbers 11 which preferably comprise an adhesive with a cloth or plastic tape back as disclosed in detail in my copending application Ser. No. 182,713, filed March 22, 1962, now Patent 3,155,926, granted November 3, 1964.

To each end of body 10 are attached ultrasonic transducers 12 and 13 each comprising piezoelectric ceramic members in the form of rectangular bars which are poled in the thickness direction, provided with electrodes and bonded to the end faces of body 10 with the poling direction parallel to the length of body 10 so as to produce and respond to vibrations in the thickness longitudinal modes. Accordingly, transducer 12 converts the electrical signals from source 14 into longitudinal vibrations for travel down body 10 to transducer 13 which converts these vibrations into electrical signals to be delivered to utilizing device 15. These components are all conventional in the art and no further consideration need to be given to them. It should be appreciated that an acoustic signal may be injected directly into body 10, thus eliminating transducer 12, or that transducer 13 may be eliminated if the desired output is an acoustic signal.

The direct current field which produces the drifting free charge carriers is impressed from a source 16, illustrated as comprising an arrangement of batteries **16*a* to 16*c* with switch 16*d* and capable of supplying a voltage of variable magnitude and reversible polarity. Obviously, the illustrated combination is merely schematic for any direct current supply having these capabilities. Source 16 is applied to electrodes on the ends of body 10 so that an electric field extends therethrough in a direction parallel to the direction of ultrasonic propagation between transducers 12 and 13. Source 16 may be connected between ohmic contacts 17 and 18 which also serve as the back contacts of transducers 12 and 13, respectively, if the direct current is isolated from signal source 14 by a capacitor 19 in series with source 14 and inductor 20 in series with source 16**. If separate contacts are employed adequate isolation is achieved by insulating the contacts from each other.

For the first two illustrative applications of the invention now to be described, the polarity of the voltage from source 16 is such as to produce a drift of charge carriers in the material of body 10 in the same direction as the ultrasonic propagation from input transducer 12 to output transducer 13. For example, if the material of body 10 is n-type semiconductor, a positive voltage should be applied to contact 18 with respect to contact 17 as illustrated by switch **16*d*** in positions L(1) or L(2).

The present invention is primarily concerned with the relative magnitude and direction of this drift as related to the phase velocity of guided wave modes supportable in body 10. First therefore the velocity characteristics of these modes will be critically considered with reference to FIGS. 2A, 2B and 2C which show, respectively, the dimensionless phase and group velocities versus frequency of the lowest three longitudinal modes L(1), L(2) and L(3). The group velocity is that parameter which determines the time delay of the group of wave components forming an elastic pulse traveling between transducers 12 and 13 and for the fundamental or first longitudinal mode L(1) is known to have the general form represented by curve 30 on FIG. 2A. See, for example, the article entitled, "Dispersive Ultrasonic Delay Lines Using the First Longitudinal Mode in a Strip," by T. R. Meeker, I.R.E. Transactions on Ultrasonic Engineering, volume UE7, No. 2, June 1960, pages 53 through 58. As indicated by curve 30 little if any dispersion is encountered at the low and high frequencies. Approximately linear dispersive operation is generally centered about an inflection point 31 in the center of this range. Associated with curve 30 is the curve 32 which illustrates the corresponding phase velocity of the L(1) mode. Phase velocity is roughly that parameter which indicates the speed with which surfaces of constant phase in the component waves making up the pulse travel along the axis of the guide.

Figure 2C:
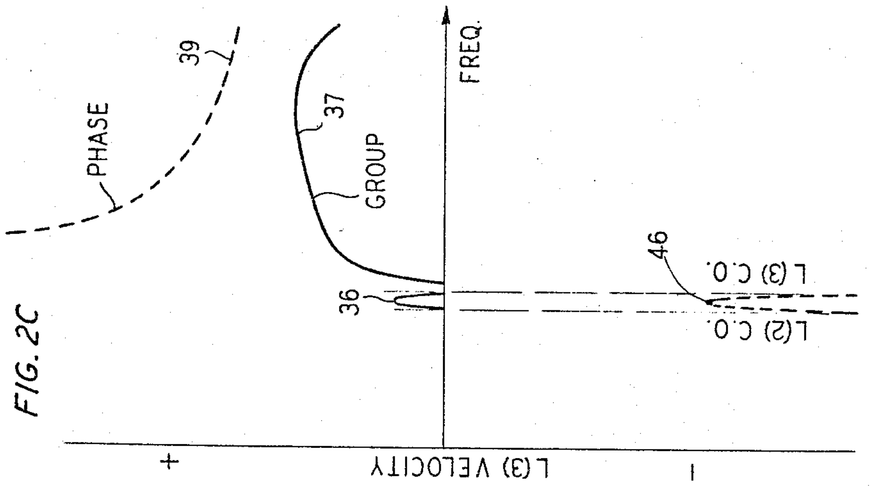
FIGS. 2A, 2B and 2C show the general shape of the velocity characteristics of guided wave modes propagating in respectively, the first, second and third longitudinal modes of elastic wave propagation.
Figure 2B:
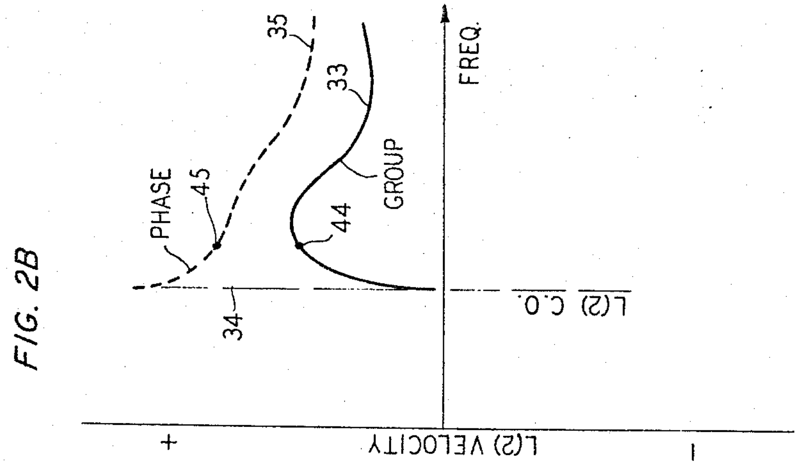

In contrast to mode L(1), curve 33 of FIG. 2B illustrates a typical group velocity characteristic for the second longitudinal mode L(2). Line 34 represents the cut-off frequency of the L(2) mode. For frequencies immediately above cut-off the group velocity increases with frequency according to a nonlinear relationship. Following this is a region in which velocity increasing according to a near parabolic function and this region is followed by another further from cut-off of velocity that decreases with increasing frequency. Associated with curve 33 is a curve 35 representing the L(2) mode phase velocity component which is infinite at cut-off and decreases nonlinearly as frequency is increased. Operation in any of the several regions or between them may be selected by controlling the cut-off frequency relative to the desired operating frequency.

Cut-off frequency is very roughly equal to that frequency having a wavelength twice the thickness dimension $h$ in the particular material. In this respect, ultrasonic cut-off is closely analogous to the cut-off condition of electromagnetic wave energy in conductively bounded waveguides. A more accurate definition of cut-off depends upon very complicated transcendental equations of wave motion, extensive treatment of which may be found in the literature. Most helpful in the present connection is the analysis "The Application of the Theory of Elastic Waves in Plates to the Design of Ultrasonic Dispersive Delay Lines," by T. R. Meeker appearing in the I.R.E. International Convention Record, 1961, volume 9, part 6, pages 327 to 333.

Holding the thickness $h$ of body 10 constant and increasing the frequency or increasing thickness for a given frequency leads to the appearance of the third longitudinal mode L(3) which has the unusual group velocity characteristic represented by curves 36 and 37 of FIG. 2C. Between the L(2) and L(3) cut-off frequencies, curve 36 represents a group velocity having associated therewith a negative phase velocity, as represented by characteristic 46, indicating that energy is transferred in a direction opposite to the actual particle movement. Above the L(3) cut-off, propagation is represented by curve 37 and its associated positive phase velocity is shown by curve 39.

Figure 3:
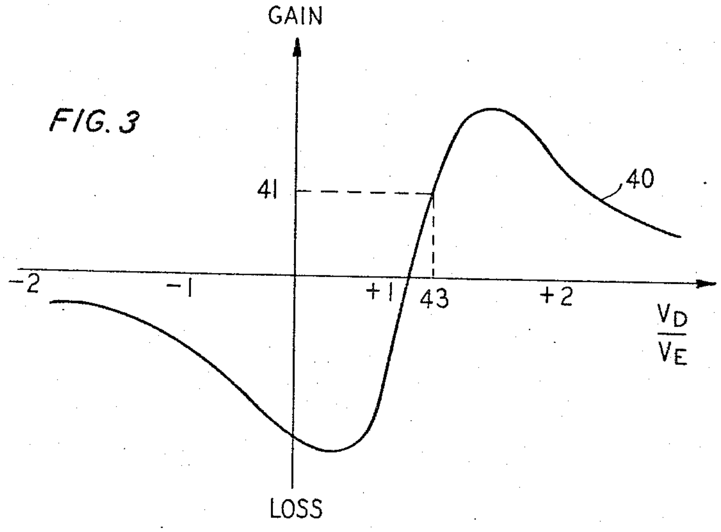
FIG. 3 is a plot of the gain or loss versus the ratio of the average carrier drift velocity to the phase velocity of sound for a given piezoelectric semiconductive elastic propagation path.

In accordance with the present invention it has been recognized that while time delay of a guided elastic wave is determined by its group velocity characteristic, interaction with the free charge carriers in body 10 depends upon the relationship of their drift velocity to the phase velocity of the elastic wave. Thus, as shown in FIG. 3, the gain or loss versus relative drift to phase velocity characteristic of a suitable interaction path is shown by way of explanation. This characteristic is similar to the one shown in the above-mentioned White application except for the fact that no distinction was made by White between phase and group velocities for the kind of elastic waves considered by him. For the purposes of the present disclosure, characteristic 40 illustrates the performance at one operating frequency for various ratios for drift velocity $V_D$ to phase velocity $V_E$. In the region representing forward propagation where $V_D$ is positive with respect to and exceeds $V_E$, that is $$\frac{V_D}{V_E}>1$$

amplification occurs; in the region where $V_D$ is positive with respect to and is less than $V_E$, that is, $$0<\frac{V_D}{V_E}<1$$

loss occurs; and in the region where the direction of the wave propagation is opposite to that of the drift velocity, that is, $$\frac{V_D}{V_E}<0$$

loss occurs for all ratios.

Figure 2A:
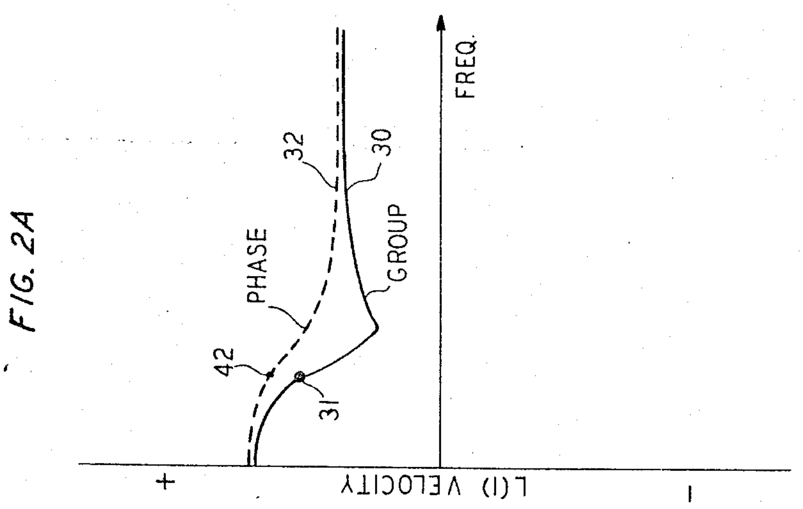

A first use of the principles of the invention involves producing a free charge interaction with the first longitudinal mode as represented by curves 30 and 32 of FIG. 2A for intended dispersive operation about inflection point 31. Such operation is desired in certain well known radar systems in order to linearly spread the time distribution of the components within a signal pulse. Unfortunately, there is also an accompanying phenomena referred to in the literature as "selective attenuation" which causes the loss to the first longitudinal mode to increase with frequency. This loss is compensated for by the invention by adjusting the potential of source 16 with switch **16*d* in position L(1) to produce a drift velocity $V_D$ that is slightly greater than the phase velocity of L(1) at the center operating frequency as represented by point 42 on FIG. 2A. Thus, the ratio of $V_D/V_E$ corresponds to point 43 on FIG. 3 and a gain represented by 41 is added to the signal. At higher frequencies the phase velocity $V_E$ decreases as shown by curve 32, the ratio of $V_D/V_E$ increases, and the gain correspondingly increases according to curve 40** to compensate for the increase in selective attenuation. At frequencies below the center operating frequency the gain correspondingly decreases to compensate for the decreased selective attenuation.

According to a second embodiment of the invention, the thickness *h* of body 10 is sufficient for a given frequency range of operation to allow propagation of the L(2) mode with the intention of utilizing some point such as 44 of its group velocity characteristic 33 as described above in connection with FIG. 2B. Point 45 on curve 35 represents the corresponding phase velocity. The drift velocity is increased as by placing switch **16*d* in position L(2) to be slightly larger than the phase velocity at point 45. While transducers 12 and 13 can also produce and respond to the L(1) mode, this mode is an undesired, spurious signal. However, the L(1) phase velocity will be less at all frequencies than the phase velocity of L(2) as may be seen by comparing curves 32 and 35 and will therefore be less than $V_D$, representing a loss on curve 40. Thus, the undesired propagation of L(1) along body 10** will be suppressed while at the same time gain will be introduced to the desired L(2) mode.

A final illustrative application of the principles of the invention provides an ultrasonic device having both bandpass frequency selectivity and amplification making it suitable for use as an ultrasonic intermediate frequency amplifier. This application utilizes the relatively narrow frequency band of the L(3) mode over which the group velocity characteristic is represented by curve 36 and the negative phase velocity is represented by curve 46 of FIG. 2C.

The polarity of the voltage supplied by source 16 is reversed from that employed in the preceding embodiments as by placing switch **16*d* in position L(3) so that a charge carrier drift is produced in the direction opposite to the direction of ultrasonic propagation from transducer 12 to transducer 13 and therefore in the same direction as the negative phase velocity represented by curve 46. Thus, the ratio of $V_D/V_E$ is still positive and when the magnitude of $V_D$ is adjusted to be slightly greater than $V_E$ as represented by point 46 on the curve 46, gain is produced but only over the limited frequency range for which the phase velocity of L(3) has its negative characteristic. Outside of this range the ratio $V_D/V_E$ becomes abruptly negative and operation is shifted to the loss portion of curve 40**. All other possible modes of propagation have phase velocities in the opposite direction to the drift velocity and also suffer loss. Thus, stable amplification is obtained, free from spurious oscillations at frequencies outside the band of interest or in other modes of propagation.

Figure 4:
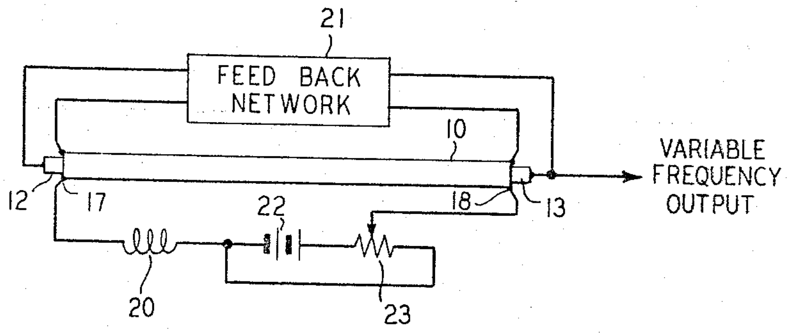
FIG. 4 illustrates a modification of the structure of FIG. 1.

A further use of the invention as a variable frequency oscillator is shown in FIG. 4 which may function with any of the foregoing modes of propagation in a range of rapid change of phase velocity with frequency. This is particularly true of the negative phase velocity characteristic by the L(3) mode as shown in FIG. 2C. Thus, the structure of FIG. 1 is modified by including a feedback network 21 between the terminals of output transducer 13 and input transducer 12. In addition, a variable voltage is provided by battery 22 and rheostat 23 between electrodes 17 and 18. As is well known, a feedback loop of this type will oscillate if the phase around the loop is such as to be regenerative and if the net loop gain is greater than unity. A network that includes a delay medium many wavelengths long has a broad phase characteristic so that there are many closely spaced discrete frequencies over a broad band that would be regenerative from a phase standpoint. On the other hand, the net loop gain, including losses in transducers 12 and 13, is only greater than unity when the amplifier is operating at a frequency for the selected mode of propagation that has a phase velocity $V_E$ bearing a ratio to the drift velocity $V_D$ in the gain producing region of FIG. 3. Since the selected mode has a $V_E$ that varies rapidly with frequency, gain can be produced only over a very narrow limited range of frequencies and above and below this limited range, gain falls rapidly and is less than unity. The frequency at which the circuit will oscillate is therefore controlled by $V_D$ which in turn is controlled by the bias voltage selected by rheostat 23. Increasing the bias voltage, increases $V_D$, which in turn allows oscillation only at a frequency having a new and larger $V_E$. Thus, the operating frequency shifts in order to continue operation at a gain producing region on FIG. 3. Which guided wave mode is employed depends upon which of the phase velocity versus frequency characteristics as shown on FIG. 2 suits the required frequency versus voltage characteristic desired for a given use. For example, use of the L(3) mode in its negative phase velocity region provides a very critical adjustment of frequency over a limited range and is preferred for most applications. However, use of other modes provides an adjustment that is less critical and extends over comparatively broader frequency ranges. Either a frequency increasing or decreasing with bias voltage may be obtained.

While the principles of the present invention have been illustrated by means of examples utilizing the lowest three longitudinal modes of propagation in strip-type guides of rectangular cross section it should be understood that these principles may be applied to other higher order longitudinal modes or to other modes having symmetrical displacement characteristics such as shear modes and to guided elastic waves in media of other cross-sectional dimensions.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. In combination, an elongated member of piezoelectric semiconductive material, means for launching an ultrasonic elastic wave including substantial energy in the third longitudinal mode for propagation through said member, said member having a rectangular cross section with a width dimension at least ten times that of the thickness dimension so that a plurality of different modes of elastic wave propagation including said third mode can travel with different phase velocities through said member, means for impressing a direct-current voltage through said member in a direction parallel to said elastic wave propagation, said voltage having such magnitude and direction that current carriers in said material drift under the influence of said voltage in a direction opposite to the direction of propagation of said energy and at a velocity which is slightly greater than the phase velocity of said third mode and substantially different from the phase velocity of other of said modes.

2. The combination according to claim 1 wherein said means for launching derives its energy from a remote portion of said member in a regenerative connection and wherein said voltage is variable within the range for which the drift velocity of current carriers in said material is within the range of variation of said phase velocity of said one mode with frequency in said given frequency range to vary the frequency of regeneration within said given frequency range.

3. An ultrasonic amplifier of limited frequency band comprising a piezoelectric semiconductive body having free current carriers, means for propagating an ultrasonic wave through said body including at least a substantial component of energy in a mode of propagation having a phase velocity in a direction opposite to the direction of energy propagation through said body within said frequency band, means for impressing a direct-current voltage extending through said body having a magnitude and direction such that the drift of current carriers responsive to said field has a velocity component in the direction opposite to said direction of energy propagation and of mangitude greater than the phase velocity of said mode in said frequency band.

4. In combination, an elongated member of piezoelectric semiconductive material, a regenerative connection including means for deriving energy from ultarsonic elastic wave in one portion of said member and for launching said derived energy in another portion of said member remote from said one portion for propagation through said member, said member having a rectangular cross section with a width dimension at least ten times that of the thickness dimension so that a plurality of different modes of elastic wave propagation can travel with different phase velocities through said member including one mode having a phase velocity that varies substantially with frequency in a given frequency range, means for impressing a direct-current voltage through said member in a direction parallel to said elastic wave propagation such that current carriers in said material drift under the influence of said voltage at a velocity which depends upon the magnitude of said voltage, said voltage being within the range for which said drift velocity is slightly greater than the phase velocity of said one mode in said given frequency range and substantially different from the phase velocity of said one mode outside said given frequency range and substantially different from the phase velocity of other of said modes so that regeneration is produced exclusively with said one mode, and means for varying said voltage within the range of variation of said phase velocity of said one mode with frequency to vary the frequency of regeneration of said one mode within said given frequency range.

References Cited by the Applicant

UNITED STATES PATENTS 3,041,556 6/1962 Meitzler.

OTHER REFERENCES

Journal of Applied Physics, volume 33, January 1962, "Elastic Wave Propagation in Piezoelectric Semiconductors," page 40.

ROY LAKE, *Primary Examiner.*

DARWIN R. HOSTETTER, *Assistant Examiner.*